United States Patent
Seipold

(10) Patent No.: US 7,300,581 B2
(45) Date of Patent: Nov. 27, 2007

(54) REMOTE MOUNTABLE FILTER ASSEMBLY

(75) Inventor: John M. Seipold, Glasford, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/273,807

(22) Filed: Nov. 15, 2005

(65) Prior Publication Data

US 2006/0201864 A1    Sep. 14, 2006

Related U.S. Application Data

(60) Provisional application No. 60/660,707, filed on Mar. 11, 2005.

(51) Int. Cl.
*B01D 35/02* (2006.01)

(52) U.S. Cl. ............... 210/232; 210/443; 210/444; 210/450

(58) Field of Classification Search .......... 210/232, 210/168, 443, 444, 450, 167.08
See application file for complete search history.

(56) References Cited

U.S. PATENT DOCUMENTS

| | | | |
|---|---|---|---|
| 2,826,436 A | 3/1958 | Hupp et al. | |
| 3,001,804 A | 9/1961 | Tomlinson et al. | |
| 3,859,216 A * | 1/1975 | Sisson et al. | 210/440 |
| 4,278,275 A | 7/1981 | Diederich, Jr. | |
| 4,492,632 A | 1/1985 | Mattson | |
| 4,865,360 A | 9/1989 | Adams | |
| 5,000,488 A | 3/1991 | Albrecht | |
| 5,104,537 A * | 4/1992 | Stifelman et al. | 210/440 |
| 5,298,158 A | 3/1994 | Anderson | |
| 5,338,075 A | 8/1994 | Albrecht | |
| 5,453,195 A * | 9/1995 | Jorgenson et al. | 210/444 |
| 5,546,999 A * | 8/1996 | Parker | 141/98 |
| 5,569,373 A * | 10/1996 | Smith et al. | 210/90 |
| 5,853,575 A * | 12/1998 | Wydra et al. | 210/136 |
| 5,888,384 A | 3/1999 | Wiederhold et al. | |
| 5,922,196 A | 7/1999 | Baumann | |
| 6,245,232 B1 | 6/2001 | Craft | |
| 6,790,348 B2 | 9/2004 | Orborn | |

* cited by examiner

*Primary Examiner*—Thomas M. Lithgow
(74) *Attorney, Agent, or Firm*—Mike King; Janda Carter

(57) ABSTRACT

A filter assembly capable of being directly mounted to a transmission housing or to a structure other than the transmission housing. The transmission housing includes a cavity, or groove that receives a sealing device, which is used when the filter assembly is to be directly mounted to the transmission housing. Both the transmission housing and the filter assembly include threaded portions in communication with additional grooves, or chamfers that receive additional sealing devices. For remote mounting, hoses, having coupling devices, are attached to the threaded portions such that the filter assembly may be attached to the structure other than the transmission housing.

15 Claims, 4 Drawing Sheets

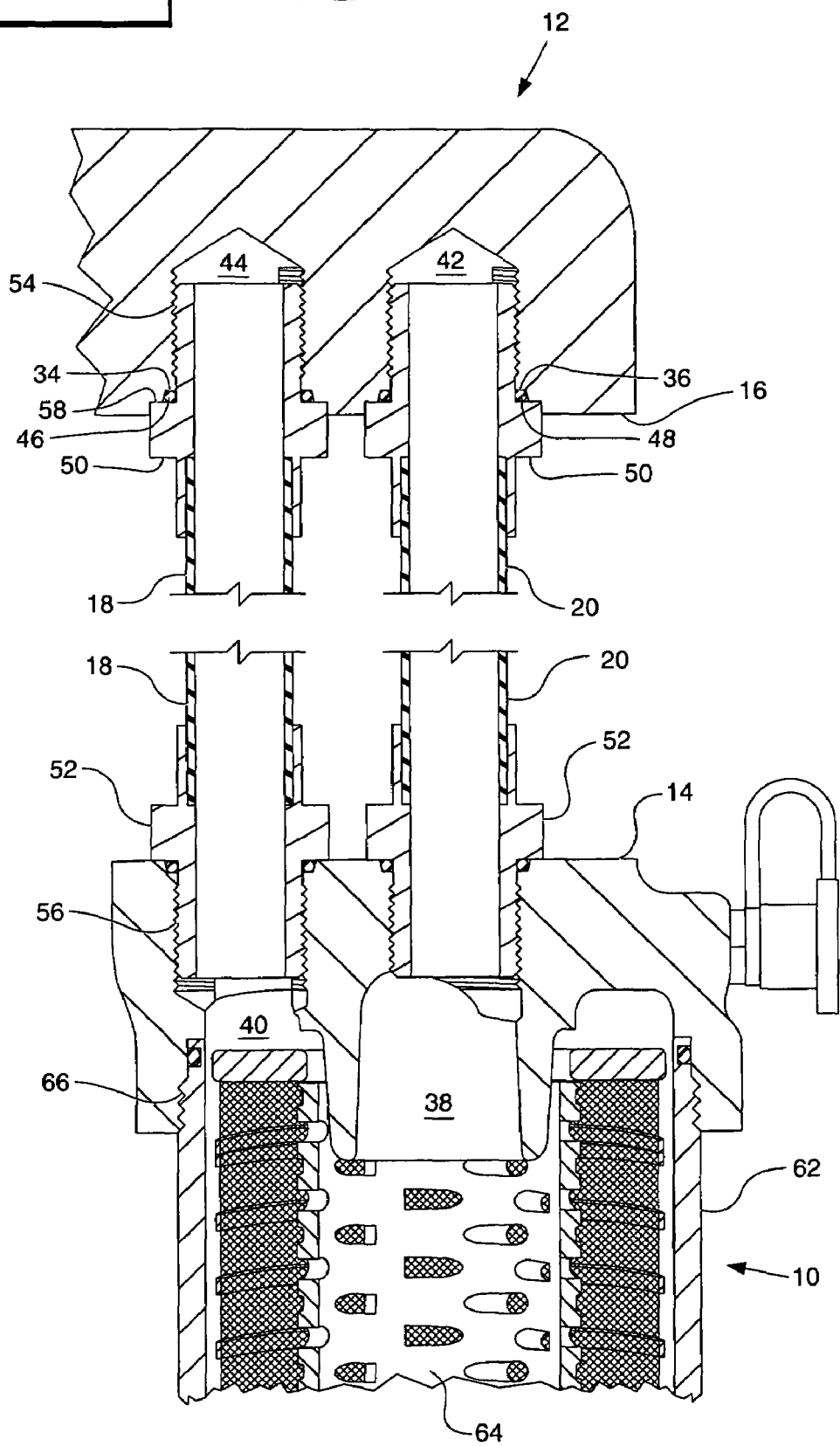
Fig_4_

REMOTE MOUNTABLE FILTER ASSEMBLY

RELATED APPLICATIONS

This application claims priority to U.S. Provisional Patent Application Ser. No. 60/660,707, entitled "Transmission Assembly", filed on Mar. 11, 2005 to Anthony R. Johnson, John M. Seipold, and Kevin G. Meyer.

TECHNICAL FIELD

The present invention generally relates to filters, and more particularly to filter assemblies capable of being directly mounted to a housing or remotely mounted to another structure.

BACKGROUND

Abrasive particles in an oil supply can damage engine and transmission components and adversely affect the performance of the machine.

Accordingly, the necessity of routine oil changes is well understood. Such maintenance is one of the most cost-effective measures which can be taken toward preserving and prolonging the useful life of a transmission.

Unfortunately, the process of changing transmission oil is both time-consuming and messy. Additionally, as working space becomes more and more cramped within the engine compartments of modern vehicles it becomes burdensome to have to change oil as frequently as prescribed. Generally, the process involves hydraulically lifting the vehicle, climbing under the vehicle, locating an oil filter, removing the oil filter, and attaching a new filter. The space constraints are tight, the engine and transmission may be extremely hot, and the mechanic performing the oil change gets dirty. As a result, changing oil is likely to be postponed or ignored to the detriment of the transmission. In fleet vehicles routine maintenance, such as scheduled oil changes, may be mandated by fleet operations. While this may ensure that the vehicles are routinely served, it does nothing to reduce or eliminate the time and mess involved in oil change. These problems and procedures for avoiding them are costly to the fleet owner in terms of both down-time and man-hours.

U.S. Pat. No. 4,92,632, issued to Fred P. Mattson, attempts to overcome the problems described above by providing an adapter that attaches to a transmission housing. A supply line of oil leaves the transmission into supply lines and travels to a remotely mounted filter, which filters the oil to remove impurities. The oil returns to the transmission through a return line and through the adapter. The Mattson patent suffers from at least one deficiency in that the filter assembly introduces the adapter, which takes additional space and increases cost.

The present invention is directed to overcome the above-identified deficiencies.

SUMMARY OF THE INVENTION

In one aspect of the present invention, a filter assembly for direct mount to a transmission housing or remote mount to a separate structure is provided. The filter assembly includes a transmission housing interface having a first fluid passage, a filter interface having a second fluid passage, a first groove around the first fluid passage, and a second groove around the second fluid passage. A diameter of one of the first or second grooves is greater than a diameter of the other of the one of the first or second groove.

In another aspect of the present invention, a filter assembly for filtering contaminants from a fluid is provided. The filter assembly includes a transmission housing interface having an inlet fluid passage and an outlet fluid passage, a filter interface having an inlet fluid passage and an outlet fluid passage, first grooves around each individual inlet and outlet fluid passage of the transmission housing interface, and second grooves around each individual inlet and outlet fluid passages of the filter interface. Diameters of the first grooves are either greater than or less than the diameters of the second grooves.

It is to be understood that both the foregoing general description and the following detailed description are exemplary and explanatory only and are not restrictive of the invention.

BRIEF DESCRIPTION OF THE DRAWING

FIG. 4 is a side cross-sectional view of a remotely located filter assembly.

DETAILED DESCRIPTION

Figure 1:
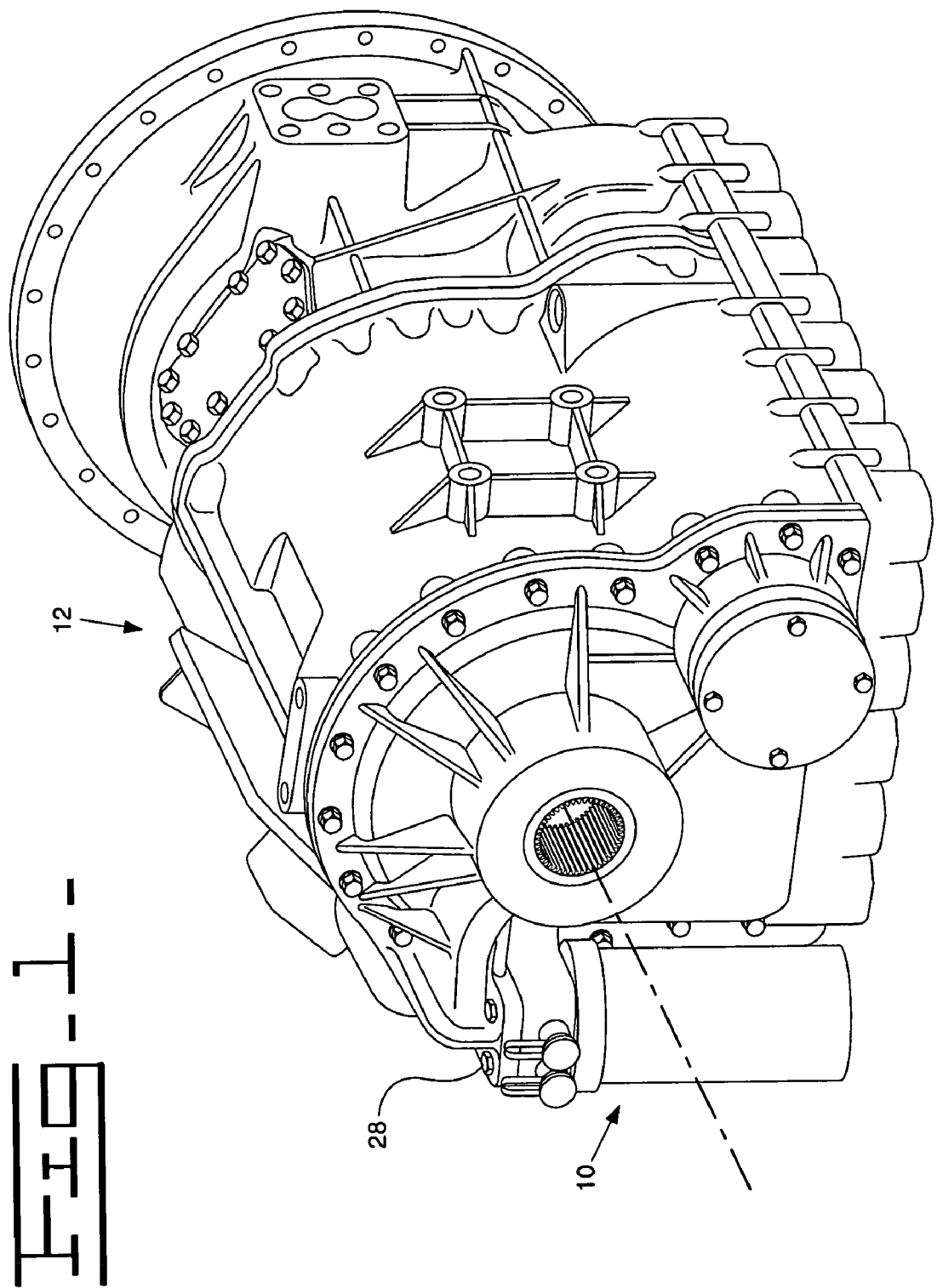
FIG. 1 is an isometric view of a modular filter assembly on a transmission.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
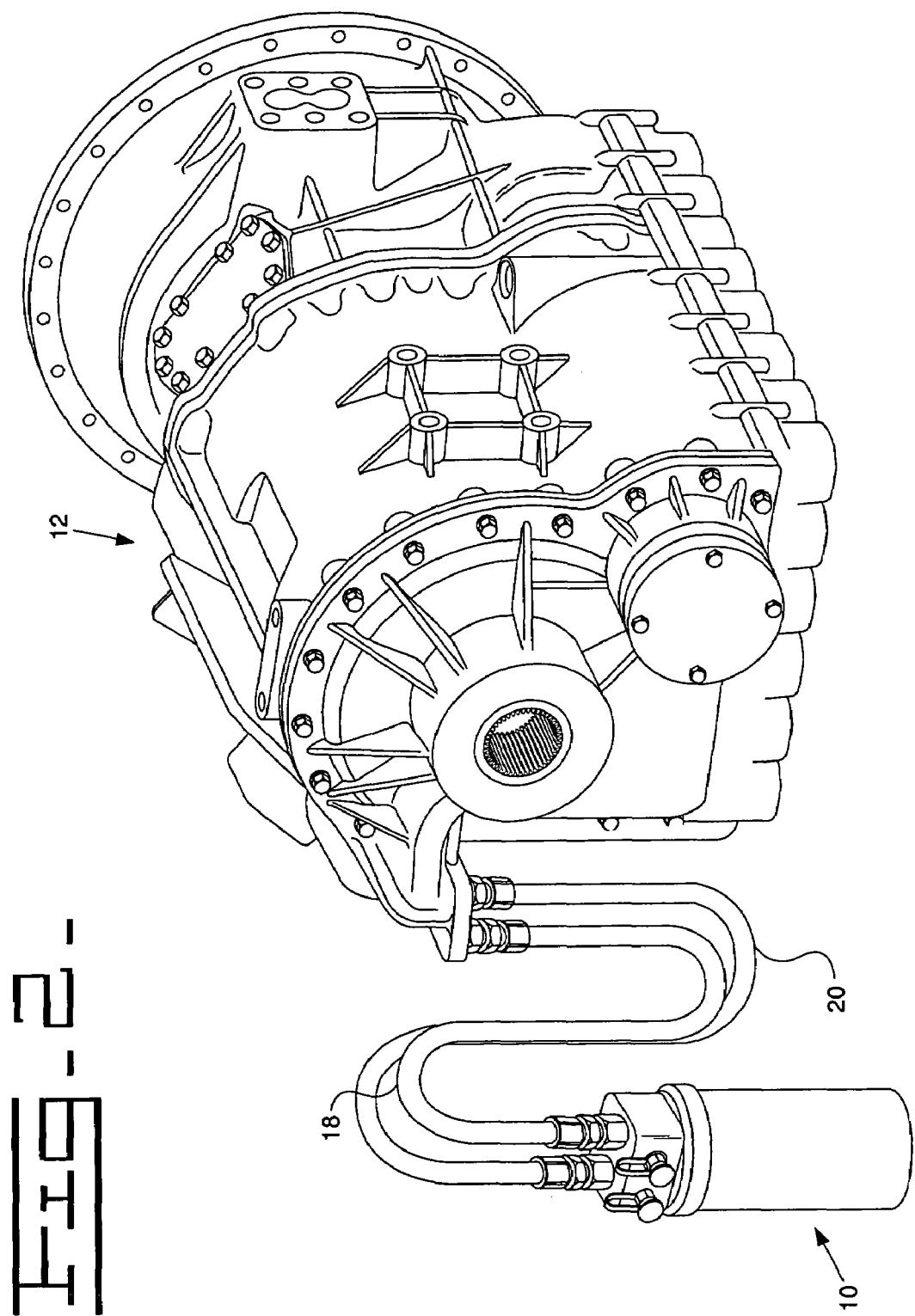
FIG. 2 is an isometric view of a modular filter assembly remotely located.

FIGS. 1 and 2 illustrate a filter assembly 10 operable to remove impurities from lubrication and/or hydraulic fluid within a transmission housing 12. The filter assembly 10 includes a filter assembly interface 14 (See FIG. 4) and a transmission interface 16 (See FIG. 4). The filter assembly interface 14 may be mounted directly to the transmission interface 16 or remotely mounted via a series of inlet and outlet communication lines, or hoses 18 and 20. The hoses 18 and 20 may be any length. Remote access provides easy access to a filter, which may be mounted at any location on a vehicle (not shown), e.g. a cab, a frame, other than the transmission interface 16.

Figure 3:
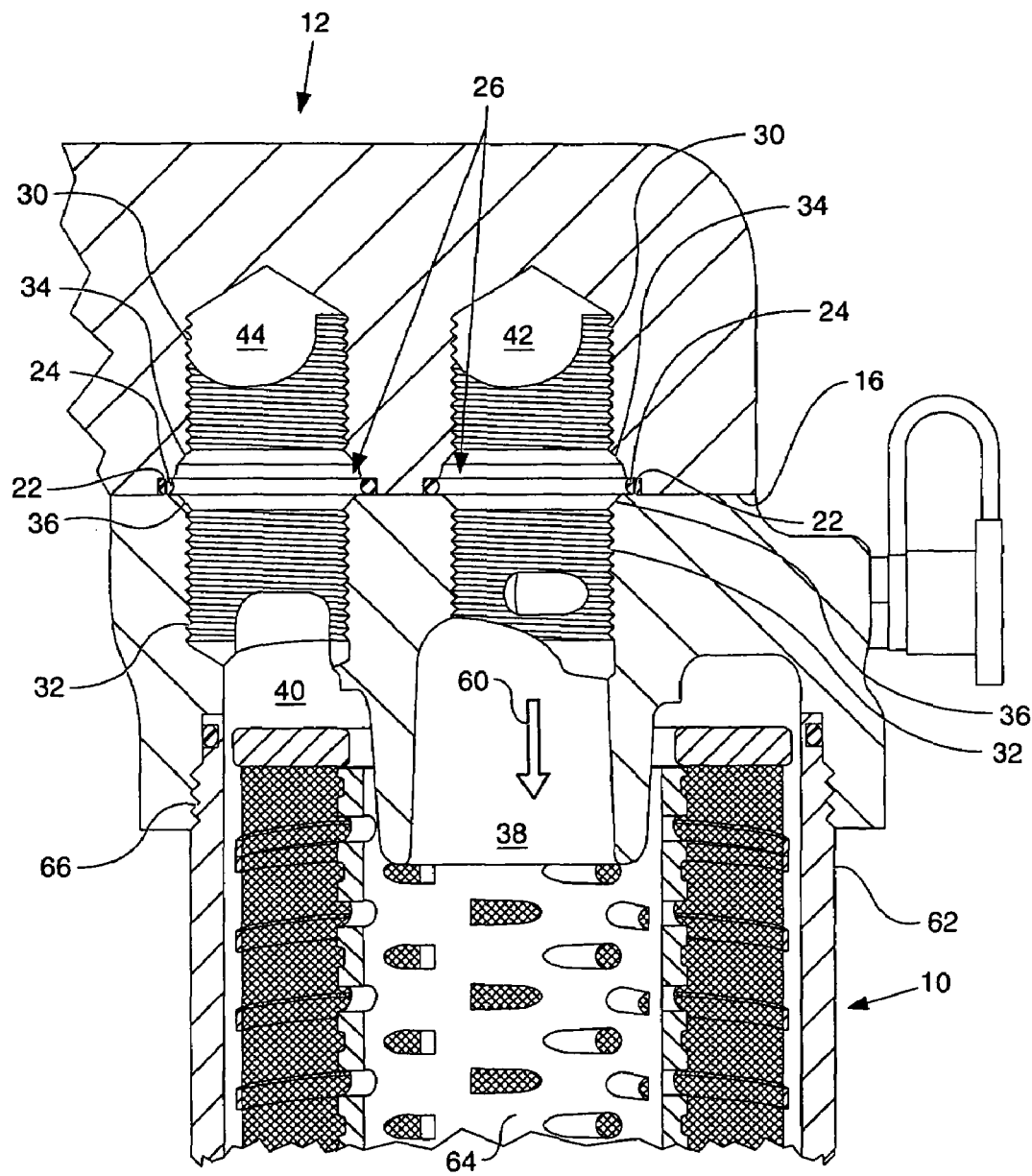
FIG. 3 is a side cross-sectional view of a locally mounted filter assembly.

FIG. 3 illustrates a cross-sectional view of the filter assembly 10 directly connected to the transmission housing 12. The transmission interface 16 includes a seal cavity, or groove 22 adapted to hold a seal device, such as an O-ring 24. The O-ring 24 encircles a fluid flow orifice, or fluid passage 26 and fits between the seal cavity 22 and the filter interface 14. Compression of the O-ring 24 between the filter assembly interface 16 and the seal cavity 22 prevents fluid from flowing between the interfaces 14 and 16 and prevents fluid leaks. In another exemplary embodiment, the seal cavity 22 is positioned on the filter interface 14. Bolts 28 secure the filter assembly interface 14 to the transmission interface 16. One skilled in the art will recognize that there are numerous securing devices that can be used including, but not limited to clamps, clasps, pins, and screws.

The orifices 26 of the transmission interface 16 and the filter assembly interface 14 include threaded portions 30 and 32 respectively. Additionally, the orifices 26 of the transmission interface 16 and filter assembly interface 14 include grooves 34 and 36, respectively. In the illustrated embodiment, groove 34 is a chamfer that connects the seal cavity 22 to the threaded portion 30, and groove 36 is a chamfer that connects the seal cavity 22 to the threaded portion 32. The diameter of grooves 34 and 36 are substantially equal. The filter assembly interface 14 includes an inlet and outlet orifice, or filter inlet and outlet passage, 38 and 40 and the transmission interface 16 includes an inlet and outlet orifice, or transmission inlet and outlet passage, 42 and 44. In another embodiment, the threaded portions 30 and 32 may be replaced with quick-connect couplers, or other similar devices.

Referring to FIG. 4, second and third O-rings 46 and 48 fit in the chamfers 34 and 36. Where remote filter mounting is preferred, the hose 18 includes transmission side and filter side couplings 50 and 52, respectively. The couplings 50 and 52 include threaded portions 54 and 56, which enter the orifices 26 and engage the threaded portions 30 and 32.

In one embodiment, the threaded portions 30, 32, 54 and 56 are threaded according to well-known fluid standards. Specifically, in the illustrated embodiment, the threaded portions 30, 32 54, and 56 are straight threaded and tighten upon engagement of a lip 58 of the couplings with the filter interface 14 and seal cavity 22.

The filter assembly 10 includes a filter housing 62 having a filter element 64 for collection of contaminants within the filter. The filter element may be a cartridge style filter 62 that removably fits within the filter housing 62 or the entire filter housing 62 may be replaceable. The filter housing includes threaded portions 66 to allow the filter housing 62 to removably secure to the filter assembly 10.

The filter assembly 10 may further be configured with mounts (not shown) operable to allow the filter assembly 10 to be attached to a structure remote from the transmission.

INDUSTRIAL APPLICABILITY

In operation, the filter assembly 10 may be used with any type of system that requires clean fluid for system operation, such as, for example, a transmission or an engine. The filter assembly 10 allows for direct attachment of a filter to the transmission 12 or remote attachment via hoses 18 and 20 to a compartment or other area of the vehicle.

For direct attachment the O-ring 24 is positioned within the seal cavity 22 of the transmission housing 12. The filter assembly 10 is placed in contact with the transmission housing 12 such that the filter assembly interface 14 and the transmission housing interface 16 substantially align. The filter assembly 10 is bolted to the transmission housing 12.

For remote attachment, the second O-rings 46 and 48 are positioned within the grooves 34 and 36. The threaded portions 54 and 56 of the couplings 50 and 52 are tightened to the threaded portions 30 and 32 of the transmission housing 12 and the filter assembly 10 sufficiently to compress the O-rings 46 and 48. The hoses 18 and 20 connect the couplings 50 and 52, which allow remote connection of the filter assembly 10 to another structure, such as the cab through additional attachment holes and/or brackets.

Regardless of the type of attachment, the fluid, or oil (not shown) flows through the output port 42 in the direction of arrow 60.

Other aspects, objects and advantages of the present invention can be obtained from a study of the drawings, the disclosure and the appended claims.

What is claimed is:

1. A filter assembly for direct mount to a transmission housing or remote mount to a separate structure, comprising:
   a transmission housing interface having a pair of first fluid passages:
   a first groove around said fluid passages;
   a filter interface having a pair of second fluid passages;
   a second groove around the second fluid passages;
   wherein a diameter of one of the first or second grooves is greater than a diameter of the other of the one of the first or second groove and
   the fluid passages of the transmission housing and the filter assembly both include threaded portions configured to receive a coupling to deliver fluid through a fluid line when the filter assembly is remotely mounted.

2. The filter assembly according to claim 1, wherein the transmission housing interface and the filter interface are connected and one of the first or second grooves includes a sealing device.

3. The filter assembly according to claim 1, further comprising a third groove on one of the transmission housing interface or the filter interface.

4. The filter assembly according to claim 3, wherein the transmission housing interface and the filter interface are connected and one of the first or second grooves includes a sealing device.

5. The filter assembly according to claim 3, wherein a diameter of the third groove is equal to the diameter of one of the first or second groove.

6. The filter assembly according to claim 5, wherein two of the first, second, and third grooves include sealing devices and wherein a hose is connected to the threaded portions of the first and second fluid passages.

7. The filter assembly according to claim 6, wherein the second and third grooves include sealing devices.

8. The filter assembly according to claim 5, wherein the second and third grooves are chamfers in communication with the threaded portions.

9. A filter assembly for direct mount to a transmission housing or remote mount to a separate structure, comprising:
   a transmission housing interface having an inlet fluid passage and an outlet fluid passage;
   a filter interface having an inlet fluid passage and an outlet fluid passage;
   first grooves around each individual inlet and outlet fluid passage of the transmission housing interface;
   second grooves around each individual inlet and outlet fluid passages of the interface;
   wherein diameters of the first grooves are either greater than or less than the diameters of the second grooves and the fluid passages of the transmission housing and the filter assembly both include threaded portions configured to receive a coupling to deliver fluid through a fluid line when the filter assembly is remotely mounted.

10. The filter assembly according to claim 9, wherein the transmission housing interface and the filter interface are connected and one of the first or second grooves includes sealing devices.

11. The filter assembly according to claim 9, wherein each of the first and second grooves include sealing devices and wherein a first hose connects the outlet fluid passage of the transmission housing interface to the inlet fluid passage of the filter assembly interface, and a second hose connects the inlet fluid passage of the transmission housing interface to the outlet fluid passage of the filter assembly interface.

12. The filter assembly according to claim 9, further comprising third grooves around each of the fluid passages one of the transmission housing interface or the filter interface.

13. The filter assembly according to claim 12, wherein diameters of the third grooves are equal to the diameters of one of the first or second grooves.

14. The filter assembly according to claim 12, wherein the second and third grooves are chamfers in communication with the threaded portions.

15. The filter assembly according to claim 9, wherein the transmission housing interface and the filter interface are connected and one of the first or second grooves of each of the fluid passages of one of the transmission housing interface or the filter assembly interface includes a sealing device.

* * * * *